United States Patent Office 3,726,694
Patented Apr. 10, 1973

3,726,694
CORROSION INHIBITING MOLYBDATE PIGMENT
AND PROCESS FOR MAKING SAME
Fred W. Moore, Plymouth, Dennis R. Robitaille, Detroit, and Henry F. Barry, Ann Arbor, Mich., assignors to American Metal Climax, Inc.
No Drawing. Filed Feb. 22, 1971, Ser. No. 117,745
Int. Cl. C09c 1/02, 1/04
U.S. Cl. 106—14
8 Claims

ABSTRACT OF THE DISCLOSURE

A process for preparing an extended corrosion inhibiting pigment comprising a particulated carrier having a molybdate coating thereon, the corrosion inhibiting pigment produced by said process and protective coating formulations incorporating said pigment in amounts which are effective to inhibit corrosion of underlying substrates over which the coating formulations are applied.

BACKGROUND OF THE INVENTION

It has been observed that certain metallic molybdate salts demonstrate a capacity to inhibit corrosion of ferrous substrates when incorporated as pigments in conventional and special coating formulations. Such molybdate pigments provide significant advantages over other known corrosion inhibiting pigments due to their non-toxicity and their neutral or white color providing for increased latitude in the preparation of coating systems of attractive colors including pastel and other comparatively light colors. In spite of these advantages, the use of corrosion inhibiting molybdate pigments has been restricted due to their relatively high cost in comparison to other more common corrosion inhibiting pigments such as zinc chromate, basic lead chromate, dibasic lead phosphite or the like. Attempts to effect a reduction in the cost of such molybdate corrosion inhibiting pigments by physically mixing the molybdate compounds with inert extender materials have been unsatisfactory due to the necessity of including upwards of fifty percent of the active molybdate constituent in order to provide adequate corrosion inhibiting properties. Even after such extension, the resultant physical mixtures are still of a higher cost than other more common commercially used corrosion inhibiting pigments.

The present invention overcomes the foregoing problems and economic disadvantages by providing a corrosion inhibiting pigment comprised of a particulated substantially inert and compatible carrier material having a controlled amount of a molybdate compound precipitated thereon, providing for good dispersibility of the active molybdate constituent throughout the coating formulation and excellent availability of the molybdate compound to perform its corrosion inhibiting function. Such non-toxic, colorless extended molybdate pigments are further characterized as being of economical cost and are competitively priced with the more common commercially available corrosion inhibiting pigments.

SUMMARY OF THE INVENTION

The benefits and advantages of the present invention are achieved by a pigment composition which possesses corrosion inhibiting properties and comprises discrete particles of a substantially inert and compatible particulated carrier having deposited on at least a portion of the surfaces thereof a metal molybdate compound in an amount sufficient to attribute corrosion inhibiting properties to the pigment and to coating compositions incorporating said pigment. Particularly satisfactory results are obtained when the metal molybdate compound is selected from the group consisting of zinc molybdate, calcium molybdate, strontium molybdate, barium molybdate and mixtures thereof, of which zinc molybdate itself or mixtures of zinc molybdate and calcium molybdate are preferred. The metal molybdate compound usually is present in an amount of from about 2% up to about 30% by weight of the total pigment composition, while amounts of from about 10% to about 25% by weight are more common and preferred. The pigment can readily be dispersed in any one of a variety of standard or specialty coating compositions incorporating conventional vehicles and is employed in amounts sufficient to impart corrosion inhibiting properties to the coating composition.

In its process aspects, the present invention is concerned with the method of preparing a corrosion inhibiting pigment of substantially high quality and uniformity, and wherein the molybdate compounds are deposited in substantially high yields. In particular, the process aspects of the present invention rely on the formation of a slurry of a substantially inert compatible particulated carrier in an aqueous solution in which an alkali metal molybdate and an aqueous soluble metal salt; e.g., metal halides, sulfates, nitrates, etc., are adapted to be dissolved and reacted in a manner to effect a precipitation or co-precipitation of the corresponding metal molybdate or molybdates on the surfaces of the suspended carrier particles with the corresponding alkali metal salt reaction product remaining in solution. Particularly satisfactory results are obtained employing aqueous solutions of sodium molybdate and zinc chloride for forming the corresponding zinc molybdate deposit on the surfaces of the inert carrier particles which preferably comprise talc, titanium dioxide, silicon dioxide and mixtures thereof.

Additional benefits and advantages of the present invention will become apparent upon a reading of the description of the preferred embodiments and the specific examples provided.

DESCRIPTION OF THE PREFERRED EMBODIMENTS

The compositions and concentrations of the various solutions, pigments and corrosion inhibiting coating compositions are set forth in the specification and the subjoined claims in terms of percentages by weight, unless otherwise expressly indicated to the contrary.

The particulated carrier material on which controlled amounts of the metal molybdate compound is deposited may comprise any one of a variety of substances which are compatible and inert relative to the molybdate constituent deposited thereon and which, moreover, do not adversely affect the chemical and physical properties of the resultant corrosion inhibiting coating composition and resultant coating produced therefrom. In accordance with the foregoing, any one or combinations of two or more of the various pigments normally incorporated in coating compositions can be satisfactorily employed provided that no adverse reaction occurs between the pigment material and the metallic molybdate compound deposited thereon. The size and configuration of the particles may vary in accordance with conventional paint technology, although it is preferred that the particle configuration is such as will maximize surface area, thereby further increasing the availability of the metallic molybdate constituent when dispersed in a coating formulation. The average particle size of the particulate carrier may broadly range from about 0.1 micron to about 25 microns, and preferably from about 0.2 micron to about 10 microns. The preferred particle size will vary within the aforementioned broad range in consideration of factors such as the amount of metal molybdate compound deposited on the particles, the type and viscosity of the coating composition in which the pigment is to be dispersed, the concentration of the pigment, the type and quantity of other pigments present, the intended end use of the coating composition, and the like.

Of the many known pigment materials suitable for use in paint formulations, the so-called extender type pigments, comprising insoluble, finely-divided solid powders which are wettable by the vehicle, are particularly satisfactory and typically include barium sulfates, calcium sulfates including gypsum, terra alba, plaster of Paris; calcium carbonate including whiting and chalk; magnesium carbonate, silicas including quartz and diatomaceous earth; magnesium silicates and related minerals such as talc and soapstone, kaolin clay, mica, pumice and the like. Of the foregoing, talc and silica constitute particularly satisfactory and low cost carrier on which the metal molybdate compound can be deposited.

In addition to the foregoing extender-type pigments, compatible colored type pigments can also be satisfactorily employed as the carrier for the metal molybdate compounds. Since the coating deposited thereon at least partly obscures the characteristic color of such pigments, the use of colored pigments as a carrier is usually restricted to those instances where the resultant color of the coating composition is not critical or at least is of secondary importance. It is usually preferred, when employing colored type pigments, to use the so-called white pigments as the compatible carrier of which titanium dioxide and zinc oxide constitute the preferred materials. Optimum versatility and benefits are provided when substantially non-toxic and colorless particulated carriers are employed on which the metal molybdate compound is deposited, providing broad latitude in the formulation of white and other light colored coating compositions which are substantially non-toxic.

The metal molybdate compound deposited on at least a portion of the surfaces of the carrier particles may comprise any compound selected from the group consisting of zinc molybdate, calcium molybdate, strontium molybdate, barium molybdate and mixtures thereof, of which zinc molybdate itself constitutes the preferred material. Excellent results are also obtained by a co-deposition or co-precipitation of more than one metal molybdate compound, of which approximately a 50/50 mixture of zinc and calcium molybdate has been found to be effective in inhibiting corrosion of metallic substrates. The corrosion inhibiting pigment may also comprise physical mixtures of two or more coated molybdate pigments of different metal molybdate compounds on the same or different carrier particles such as, for example, a mixture comprised of equal volumes of a 10% zinc molybdate on talc and a 10% calcium molybdate on talc. The quantity of metal molybdate compound deposited on the surfaces of the particulated carrier can range from that amount at which a measurable increase is discernible in the corrosion inhibiting properties of a paint formulation incorporating significant portions of such pigment to amounts of up to about 30% and even greater. Generally, amounts of at least about 2% are deposited, whereby an adequate supply of the metal molybdate compound is available to provide a corrosion inhibiting function over extended time periods when such pigment is incorporated in appreciable quantities in conventional paint formulations. More frequently, the metal molybdate compound is employed in amounts ranging from about 10% up to about 25% which provides for satisfactory corrosion inhibiting performance of paint formulations incorporating moderate amounts of the coated pigment either alone or in combination with other conventional pigments. Corrosion inhibiting pigments of the type comprising the present invention incorporating greater than about 30% of the metal molybdate compound or compounds are generally less desirable from an economic standpoint than similar pigments incorporating lesser quantities.

The extended corrosion inhibiting pigment comprising the present invention can be employed for formulating an appropriate protective coating composition or paint either of the conventional or specialty types. The term "paint," as employed herein, is used in its broad sense to include any one of a variety of liquid mixtures consisting essentially of a liquid vehicle and the solid particulated pigment dispersed therethrough which, upon application to a substrate, is effective to form a substantially dry, thin protective film. The paint vehicle itself comprising the liquid portion of the paint composition may be composed of any one of a variety of film-forming components also referred to as the binder and a volatile solvent or thinner which may evaporate during the drying of the paint film or in some cases, may react and itself become a portion of the resin or binder. The solvent or thinner constituent of the vehicle may be omitted in such cases where the paints are of a type that are adapted to be applied by a hot melt, an electrostatic spray or flame spray technique, whereby the thinning effect of such solvents is unnecessary.

The binder constitutent of the liquid vehicle includes those which are adapted to form a resultant film by either oxidation or polymerization of the constituents of which drying oils, including modified drying oils, formaldehyde condensation resins including phenolic, urea and triazine resins; allyl resins and polyurethane resins, are typical. In addition to the foregoing, binder constituents which form a film as a result of the evaporation of the volatile solvent or thinner or a congealing thereof from a melt can also be satisfactorily employed including as typical examples: nitrocellulose and other cellulose esters and ethers of the types employed in lacquer formulations, vinyl resins, styrene resins, any one of a variety of the polyacrylates and polymethacrylates, rubber derivatives, polyamide resins, and polyolefins of which polyethylene is exemplary. Less common but also applicable are paint formulations incorporating binders which form a film in response to a coagulation of the binder particles from a latex or dispersion of natural or synthetic binding agents, as well as resins such as polytetrafluoroethylene and high molecular weight vinyl resins including plastisols which frequently require a subsequent heat treatment to effect a thermal fusion of the particles into a substantially continuous film.

It will be apparent from the foregoing that the specific type of binder and the proportions in which the binder is employed in combination with the corrosion inhibiting pigment of the present invention will vary depending upon the chemical characteristics of the paint system, as well as the intended end use of the coating composition. Of the various feasible paint systems, alkyd resin based organic coating systems incorporating a solvent in combination with the corrosion inhibiting pigment and other coloring and extender-type pigments is the most common for industrial finishing operations. Included among such alkyd type coating compositions are amine modified alkyds including amine resins such as urea and melamine resins. Epoxy and modified epoxy resins also provide an excellent binder system with which the coated pigment comprising the present invention can be advantageously employed. A number of typical paint formulations are described in Examples 18–30, which are illustrative of some of the vehicle systems with which the corrosion inhibiting pigment can be employed to provide improved protection to ferrous type substrates.

In the process aspects of the present invention, the deposition or precipitation of the metal molybdate compound in the form of a relatively uniform adherent coating is achieved by contacting the surfaces of the carrier particles with a liquid reaction medium containing the dissolved metal ion and then with a companion solution containing the dissolved molybdate ion, whereupon the resultant metal molybdate salt is formed and precipitates as an adherent deposit on the surfaces of the particulated carrier. The metal ion constituent of the metal molybdate compound which may comprise any compatible aqueous soluble salt; namely, the zinc, calcium, strontium and/or barium metal ions, are preferably supplied in the form of an aqueous solution of the corresponding halogen, sulfate or nitrate salt, as well as mixtures thereof. The molybdate ion similarly is preferably supplied in the form of an aqueous solution of the corresponding alkali metal molybdate salt. The term "alkali metal," as herein employed, is used in its broad sense to include sodium, potassium, lithium and ammonium, as well as mixtures thereof. Of the foregoing, the sodium molybdate compound constitutes the preferred material.

The concentration of the metal salt in the aqueous reaction solution may broadly range from about 5% to about 30%, and preferably from about 10% to about 20%. The alkali metal molybdate salt similarly may broadly range in concentration from about 5% to about 30%, and preferably from about 10% to about 20%. Normally, the concentration of the molybdate salt and quantity of reaction solutions used is controlled so as to provide a stoichiometric amount of the molybdate ion relative to the corresponding metal ion to form the corresponding metal molybdate precipitate on the surfaces of the carrier particles. The carrier particles can be incorporated in the form of a slurry at concentrations generally ranging from as low as about 30% to as high as about 60%. Preferably, the concentration of the carrier particles is controlled from about 40% to about 50% to assure the maintenance of a substantially uniform suspension and to further obtain a substantially uniformly coated product which can be readily extracted from the liquid component by decantation and/or filtration.

The aqueous solutions containing the metal halide and the dissolved alkali metal molybdate may also contain other dissolved ions so as to provide an appropriate adjustment of the pH thereof within a range of about 6 to about 9.

In accordance with a preferred form of the process comprising the present invention, a controlled quantity of the particulated solid carrier material is agitated in the aqueous solution containing the alkali metal molybdate in a manner so as to form a substantially uniform suspension. Such agitation is carried on for a period sufficient to assure substantially complete wetting of the surfaces of the carrier particles with the aqueous solution which may generally range from as little as several minutes up to periods of one hour or more. After the required agitation period, an appropriate amount of the aqueous solution containing the dissolved metal salt is added which is accompanied by a precipitation and deposition of the corresponding metal molybdate as an aqueous insoluble constituent on the surfaces of the suspended carrier particles accompanied by a progressive increase in the size thereof.

The reaction solution containing the coated suspended particles is preferably thereafter heated to a temperature of about 90° C. to about 100° C., whereafter the resultant solid product is separated from the aqueous reaction solution by decantation or filtration. The resultant solid material is washed with water in order to remove the residual soluble salts, after which the washed product can be air dried at room temperature or dried at an elevated temperature, such as about 110° C., to remove the residual moisture therefrom. The resultant dried powder can be suitably subjected to a light crushing or grinding operation to break up any agglomerates that may have formed during the filtration and drying steps.

It is further contemplated that the carrier particles can be subjected to a plurality of such deposition treatments in order to provide the desired amount of deposit of the metal molybdate compound thereon or combinations of such compounds as a result of employing solutions of alternative compositions. It is also contemplated that in lieu of forming a slurry of the particles, the particulated carrier can be wetted by one solution and thereafter extracted, such as by filtration, and the wetted particles contacted by the other solution so as to effect a preferential deposition of the corresponding metal molybdate on the surfaces thereof. The deposition of mixtures of the several metal molybdate compounds on the carrier particles can also be achieved by employing solutions containing appropriate mixtures of the corresponding metal salts for contacting with the alkali metal molybdate in the presence of the carrier particles.

Further details regarding the product and process aspects comprising the present invention are provided by the specific examples hereinafter set forth illustrating typical compositions and conditions which can be satisfactorily employed in the practice of the present invention. It will be understood that the examples are provided for illustrative purposes and are not intended to be limiting of the invention as herein described and as set forth in the subjoined claims.

In Examples 1–17, finely particulated talc is employed as the particulated carrier on which the metal molybdate compounds are deposited. The specific carrier material comprises a material designated as Asbestine 325 and Asbestine 625, available from International Talc Company. The properties and analysis of these materials is set forth in Table I.

TABLE I.—PROPERTIES AND ANALYSIS OF TALC USED

| | Asbestine 325 | Asbestine 625 |
|---|---|---|
| Property: | | |
| Percent less than 325 mesh | 99.95 | 100 |
| Percent less than 625 mesh | | 99.9 |
| Average particle size (microns) | 4.6 | |
| Specific gravity | 2.78 | 2.78 |
| Weight per solid gallon (lbs.) | 23.16 | 23.16 |
| Moisture, percent | 0.65 | |
| Structure | Plateyacicular | Plateyacicular |
| Typical analysis: | | |
| SiO₂, percent | 52.84 | 53.0 |
| MgO, percent | 31.09 | 31.1 |
| CaO, percent | 8.28 | 3.0 |
| Loss on ignition, percent | 6.92 | |
| pH of 10% slurry | 9.5 | 9.5 |

The Asbestine 325 material is employed in all of Examples 1–17 with the exception of Example 16, in which the Asbestine 625 is used.

The particular materials and the concentrations employed for forming the extended corrosion inhibiting pigment in laboratory scale quantities are set forth in Table II–A. For comparison purposes, 100% CaMoO₄ (Example 1) and 100% ZnMoO₄ (Example 5) have been included in this table.

TABLE II-A

| Example number | Type of product | Talc weight [1] | Metal chloride | | | | Na₂MoO₄·2H₂O | | |
|---|---|---|---|---|---|---|---|---|---|
| | | | Type | Weight Grams | Mols | Water (ml) | Weight Grams | Mols | Water (ml.) |
| 1 | CaMoO₄ | | CaCl₂ | 24.4 | 0.22 | 200 | 48.4 | 0.20 | 200 |
| 2 | 20% CaMoO₄ | 160 | CaCl₂ | 24.4 | 0.22 | 100 | 48.4 | 0.20 | 200 |
| 3 | 20% CaMoO₄ | 100 | CaCl₂ | 15.3 | 0.14 | 100 | 30.2 | 0.14 | 150 |
| 4 | 20% CaMoO₄ | 800 | CaCl₂ | 128.2 | 1.05 | 500 | 254.0 | 1.05 | 1,000 |
| 5 | ZnMoO₃ | | ZnCl₂ | 24.2 | 0.18 | 100 | 43.0 | 0.18 | 300 |
| 6 | 5% ZnMoO₄ | 950 | ZnCl₂ | 31.8 | 0.23 | 1,100 | 56.4 | 0.23 | 700 |
| 7 | 10% ZnMoO₄ | 900 | ZnCl₂ | 63.7 | 0.47 | 1,000 | 113.0 | 0.47 | 500 |
| 8 | 10% ZnMoO₄ | 900 | ZnCl₂ | 67.2 | 0.49 | 1,500 | 119.3 | 0.49 | 500 |
| 9 | 10% ZnMoO₄ | 900 | ZnCl₂ | 67.2 | 0.49 | 1,500 | 119.3 | 0.49 | 500 |
| 10 | 20% ZnMoO₄ | 160 | ZnCl₂ | 24.2 | 0.18 | 120 | 43.0 | 0.18 | 200 |
| 11 | 20% ZnMoO₄ | 100 | ZnCl₂ | 30.0 | 0.22 | 125 | 50.0 | 0.21 | 150 |
| 12 | 20% ZnMoO₄ | 800 | ZnCl₂ | 121.0 | 0.89 | 1,800 | 215.0 | 0.89 | 500 |
| 13 | 20% ZnMoO₄ | 800 | ZnCl₂ | 127.3 | 0.93 | 1,200 | 226.0 | 0.93 | 500 |
| 14 | 20% ZnMoO₄ | 800 | ZnCl₂ | 127.3 | 0.93 | 1,500 | 226.0 | 0.93 | 500 |
| 15 | 20% ZnMoO₄ | 800 | ZnCl₂ | 127.3 | 0.93 | 1,500 | 226.0 | 0.93 | 500 |
| 16 | 20% ZnMoO₄ | 800 | ZnCl₂ | 127.3 | 0.93 | 2,400 | 226.0 | 0.93 | 500 |
| 17 | {10% CaMoO₄ / 10% ZnMoO₄} | 800 | CaCl₂ / ZnCl₂ | 64.4 / 63.7 | 0.58 / 0.47 | 900 | 240.5 | 0.99 | 600 |

[1] Assuming product is equal weight mixture of CaMoO₄ and ZnMoO₄.

The properties of the resultant product and the percent yield of the pigment based on the original molybdenum content present in the solution is set forth in Table II-B.

TABLE II-B

| Example number | Weight (g.) | Metal (percent) | Mo (percent) | Mo/metal ratio | Molybdate [1] | Yield [2] (percent) | Specific gravity (g./ml.) |
|---|---|---|---|---|---|---|---|
| 1 | 40.6 | 19.21 | 46.53 | 1.01 | | 98.5 | 3.57 |
| 2 | 200 | | 9.31 | | 19.5 | 97.0 | |
| 3 | 110 | | 4.44 | | 9.3 | 40.7 | |
| 4 | 998 | | 9.74 | | 20.3 | 96.6 | 3.00 |
| 5 | 35.4 | 23.69 | 37.45 | 1.08 | | 77.5 | 3.66 |
| 6 | 978 | 1.39 | 1.66 | 0.92 | 3.9 | 72.7 | 2.76 |
| 7 | 974 | 2.68 | 3.91 | 0.99 | 9.2 | 85.0 | 2.99 |
| 8 | 985 | [3] 3.03 | [3] 4.21 | 0.96 | 9.9 | 89.7 | |
| 9 | 985 | [3] 3.03 | [3] 4.21 | 0.96 | 9.9 | 89.7 | |
| 10 | 200 | 5.07 | 8.27 | 1.11 | 19.5 | 96.9 | 2.91 |
| 11 | 124 | 5.41 | 7.89 | 0.98 | 18.5 | 49.3 | |
| 12 | 980 | 4.04 | 8.09 | 1.36 | 19.0 | 92.8 | 3.05 |
| 13 | 996 | 3.51 | 8.46 | 1.64 | 19.9 | 94.0 | 3.04 |
| 14 | 994 | [4] 5.34 | [4] 8.53 | 1.09 | 20.0 | 95.1 | |
| 15 | 993 | [4] 5.34 | [4] 8.53 | 1.09 | 20.0 | 95.0 | |
| 16 | 993 | 4.94 | 8.48 | 1.17 | 19.9 | 94.0 | 3.09 |
| 17 | {980 / ——} | {—— / 2.61} | {—— / 8.87} | {—— / 2.32} | [5] 19.7 | 91.1 | 2.75 |

[1] Molybdenum content converted to anhydrous metal molybdate.
[2] Based on Mo content.
[3] Runs 8 and 9 blended together.
[4] Runs 14 and 15 blended together.
[5] Assuming product is equal weight mixture of CaMoO₄ and ZnMoO₄

With the exception of Examples 3, 11 and 17, a procedure as previously described is employed for effecting a precipitation of the zinc or calcium molybdate on the surfaces of the talc carrier particles. In each instance, the quantity of talc is suspended in a stirred solution containing sodium molybdate which is stirred for a period of about one hour, and thereafter the corresponding calcium or zinc chloride solution is added to form a precipitate and deposition of the corresponding metal molybdate on the particle surfaces. The resultant mixture is thereafter heated to about 90° C., filtered and the recovered pigment dried.

In Examples 3 and 11, the treatment is such as to effect a preferential coating of the corresponding metal molybdate on the talc particles by alternately dipping the talc in the sodium molybdate solution and the metal chloride solution. In each instance, the talc is stirred with the solution of sodium molybdate for a period of about one hour, whereafter the suspension is filtered and the filtrate saved. The wet talc thereafter is stirred for a period of about one-half hour with the corresponding metal chloride solution which is heated to a temperature of about 90° C.; the filtrate is saved. The process is then repeated one additional time. As will be noted in Tables II-A, II-B, the talc in Example 3 evidences a 10% weight gain, providing a 40.7% yield; whereas in Example 11, the talc evidences a 24% weight gain, providing a yield of about 49.3%, which indicates that zinc molybdate is more readily precipitated by this technique than the corresponding calcium molybdate.

In Example 17, a simultaneous deposition of calcium and zinc molybdate on the talc pigment is performed. The talc extender pigment is initially suspended in a solution of calcium and zinc chloride and stirred for a period of one hour, whereafter the solution of sodium molybdate is added. The suspension turns white and the suspended particles are filtered, water washed and thereafter dried. A yield, as indicated in Table II-A, of about 91% is obtained. An analysis of the zinc content of the resultant product provided an estimate that the product contains about 9% zinc molybdate and about 10.5% calcium molybdate.

A duplication of some of the test procedures employed in Examples 1–17 was performed on a large scale corresponding to commercial operation and excellent yields of the corrosion inhibiting pigment were obtained.

In order to further demonstrate the excellent corrosion inhibiting characteristics of paint formulations incorporating controlled amounts of the pigment product comprising the present invention, a series of experimental paint formulations was prepared which is representative of alkyd resin base paints. The specific formulations are set forth in Table III:

TABLE III.—COMPOSITION OF EXPERIMENTAL PAINTS

| | Formulation designation | | | | | | | | | | | | |
|---|---|---|---|---|---|---|---|---|---|---|---|---|---|
| | 18 | 19 | 20 | 21 | 22 | 23 | 24 | 25 | 26 | 27 | 28 | 29 | 30 |
| Titanium dioxide | 305.6 | | | 152.8 | | | | | | | | | |
| Basic zinc chromate | | 268.0 | | | | | | | | | | | |
| Asbestine 325 (talc) | | | 217.8 | 108.9 | | | | | | | | | |
| Calcium molybdate | | | | | 139.9 | | | | | | | | |
| Zinc molybdate | | | | | 143.4 | | | | | | | | |
| 5% ZnMoO₄ on Asbestine 325 | | | | | | 219.9 | | | | | | | |
| 10% ZnMoO₄ on Asbestine 325 | | | | | | | 222.3 | | | | | | |
| 20% ZnMoO₄ on Asbestine 325 | | | | | | | | 228.4 | 342.6 | 456.8 | | | |
| 20% ZnMoO₄ on Asbestine 625 | | | | | | | | | | | 228.4 | | |
| 20% CaMoO⁴ on Asbestine 325 | | | | | | | | | | | | 227.7 | |
| 10% ZnMoO₄ 10% CaMoO₄ on Asbestine 325 | | | | | | | | | | | | | 228.2 |
| Alkyd resin | 688.5 | 688.5 | 688.5 | 688.5 | 688.5 | 688.5 | 688.5 | 688.5 | 602.5 | 470.3 | 688.5 | 688.5 | 688.5 |
| Lead naphthenate | 7.2 | 7.2 | 7.2 | 7.2 | 7.2 | 7.2 | 7.2 | 7.2 | 6.3 | 4.9 | 7.2 | 7.2 | 7.2 |
| Cobalt naphthenate | 2.9 | 2.9 | 2.9 | 2.9 | 2.9 | 2.9 | 2.9 | 2.9 | 2.5 | 2.0 | 2.9 | 2.9 | 2.9 |
| Manganese naphthenate | 1.1 | 1.1 | 1.1 | 1.1 | 1.1 | 1.1 | 1.1 | 1.1 | 1.0 | 0.8 | 1.1 | 1.1 | 1.1 |
| Total weight | 1,005.3 | 967.7 | 917.5 | 961.4 | 983.0 | 918.6 | 922.0 | 928.1 | 954.9 | 934.8 | 928.1 | 927.4 | 927.9 |

The pigment volume concentration (PVC) was 20% for all formulations except Examples 26 and 27 in which the extended 20% zinc molybdate pigment on Asbestine 325 was raised to 30% and 40%, respectively. The alkyd resin employed is typical of that used in the formulation of alkyd-based paints and is available from Reichhold Chemicals, Inc., under the designation Beckosol 11–070. The lead naphthenate product containing 24% lead, the cobalt naphthenate product containing 6% cobalt and the manganese naphthenate product containing 6% manganese, are all commercially available from Tenneco Chemicals, Inc. The coating compositions are prepared employing a three-roll mill and the resultant blends are thereafter diluted with mineral spirits to produce a dry film thickness of about 1.5 mils on four-inch by six-inch panels of SAE 1010 cold-rolled and Bonderized steel.

The resultant coated panels were subjected to tests to evaluate the corrosion inhibition properties of the compositions containing the pigment corresponding to the present invention relative to a conventional titanium dioxide containing formulation represented by Example 18, a basic zinc chromate corrosion resistant paint formulation represented by Example 19, a standard paint formulation containing only the Asbestine 325 extender pigment as represented by Example 20, a similar standard paint formulation comprising a mixture of titanium dioxide and talc pigments represented by Example 21, and a corrosion inhibiting protective coating exemplified by Example 22 containing approximately equal portions of non-extended ground calcium and zinc molybdate pigments.

The cold-rolled steel panels having a coating of the experimental paints thereon were scored with a large X and then subjected to a 5% salt-fog atmosphere at 96° F. for periods of 150 hours and 300 hours. The Bonderized steel panels remained in the salt-fog corrosion environment for a period of 500 hours. At the completion of the tests, the coatings were removed and the substrates evaluated for corrosion inhibition and undercutting adjacent to the score lines.

An evaluation of the results of these corrosion tests revealed that alkyd resin based paints containing about 20% of the extended zinc molybdate pigment on talc produced highly effective anti-corrosion coatings for cold-rolled and Bonderized steels. The molybdate-talc pigments were also found to compare favorably with similar coatings containing the basic zinc chromate or regular calcium and zinc molybdate pigments. In view of the foregoing, it is evident that paint systems incorporating 5% to 20% of the extended zinc molybdate coated talc pigment are economically as attractive as similar coatings containing basic zinc chromate; they are economically more attractive than regular calcium or zinc molybdate pigmentation on an equal volume basis. It is further observed that the corrosion resistance of molybdate containing talc pigments is directly related to the weight concentration of the molybdate constituent between about 5% to about 20% tested. In addition, of the several extended pigments tested, the zinc molybdate coated on talc is apparently more effective than the calcium molybdate coated talc or calcium and zinc molybdate coated pigments.

Further evaluations were made of the molybdate extended pigments comprising the present invention in comparison to paint formulations incorporating a known basic lead silicochromate corrosion inhibiting pigment employing a vehicle consisting of a linseed oil modified alkyd resin in mineral spirits to form conventional industrial type coatings. The extended zinc molybdate pigment deposited on talc which was evaluated was white and non-toxic and provided for satisfactory corrosion protection in comparison to that provided by the basic lead chromate pigment which is colored and of a toxic nature.

Typical all-purpose quick-drying enamels were also prepared to evaluate the extended zinc molybdate pigment relative to the corrosion inhibiting properties of a dibasic lead phosphite pigment. The test results reveal that an extended zinc molybdate pigment prepared in accordance with the present invention exhibited generally superior performance to similar coatings incorporating the dibasic lead phosphite pigment, which is one of the most common white corrosion inhibiting pigments in use at the present time.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A pigment possessing corrosion inhibiting properties comprising discrete particles of an average particle size of up to about 25 microns of a substantially inert compatible material having deposited on the surfaces thereof a metal molybdate compound selected from the group consisting of zinc molybdate, calcium molybdate, strontium molybdate, barium molybdate and mixtures thereof in an amount from about 2% to about 30% by weight and sufficient to attribute corrosion inhibiting properties thereto.

2. The pigment as defined in claim 1, wherein said carrier is a material selected from the group consisting of talc, silicon dioxide, titanium dioxide and mixtures thereof.

3. The pigment as defined in claim 1, wherein said metal molybdate compound is present in an amount of about 2% to about 30% of said pigment.

4. The pigment as defined in claim 1, wherein said metal molybdate compound is present in an amount of from about 10% to about 25% of said pigment.

5. The pigment as defined in claim 1, in which said metal molybdate consists essentially of zinc molybdate.

6. The pigment as defined in claim 1, in which said metal molybdate compound comprises a mixture of zinc molybdate and calcium molybdate.

7. The pigment as defined in claim 1, in which said particles are of an average size of from about 0.1 micron to about 25 microns.

8. A process for making an extended corrosion inhibiting molybdate pigment comprising the steps of providing a finely-particulated solid carrier material of an average particle size of up to about 25 microns, alternately contacting said carrier material with an aqueous solution containing a dissolved metal ion selected from the group consisting of zinc, calcium, strontium, barium and mixtures thereof and a companion solution containing a dissolved metal molybdate ion in a manner to effect the formation of the corresponding sparingly soluble metal molybdate salt as an adherent deposit on the surfaces of said carrier material and present in an amount of from about 2% up to about 30% by weight, and thereafter extracting the coated said carrier material from said solution.

References Cited

UNITED STATES PATENTS

| | | | |
|---|---|---|---|
| 3,004,857 | 10/1961 | Merson et al. | 106—292 |
| 3,072,495 | 1/1963 | Pitrot | 106—308 B |
| 3,353,979 | 11/1967 | Hunn | 106—292 |

LORENZO B. HAYES, Primary Examiner

U.S. Cl. X.R.

106—288 B, 292, 299, 306; 117—100 B